United States Patent Office 3,801,617
Patented Apr. 2, 1974

3,801,617
THIOPHENYL ETHER DISILOXANES AND TRI-
SILOXANES USEFUL AS LUBRICANT FLUIDS
James C. Fletcher, Administrator of the National Aeronautics and Space Administration, with respect to an invention of Norman Bilow and Richard I. Akawie, Los Angeles, Calif.
No Drawing. Filed July 24, 1973, Ser. No. 382,262
Int. Cl. C07f 7/08
U.S. Cl. 260—448.2 N           5 Claims

ABSTRACT OF THE DISCLOSURE

Thiophenyl ether siloxanes having the formula

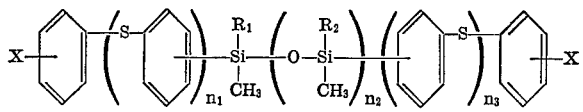

where X is a hydrogen or halogen atom or an alkyl, aryl or aralkyl radical, $n_1$ and $n_3$ are integers from 1 to 3, $n_2$ is an integer from 1 to 2 and $R_1$ and $R_2$ are methyl or phenyl radicals. Compounds embodying the invention exhibit favorable properties for use as lubricants and functional fluids under severe conditions of temperature, radiation and vacuum.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435, 42 U.S.C. 2457).

BACKGROUND OF THE INVENTION

This invention relates to organosilicon compounds and to lubricant fluids for service under extreme conditions.

Presently available lubricant base fluids fail to meet all of the requirements imposed for use in advanced space propulsion systems, and particularly for applications involving exposure to nuclear or solar radiation. In addition to a high degree of radiation resistance, lubricant fluids for such applications should exhibit liquidity over a wide temperature range, such as −50° F. to +500° F., a vapor pressure low enough for use in the high vacuum of space and good lubricity. Polyphenyl ether compounds have been found to have good radiation resistance and lubricity, but no individual polyphenyl ether has the combined properties of fluidity at ambient and lower temperatures and low volatility in vacuum. Other chemical compounds which exhibit favorable fluid properties at low temperatures, for example, silicones, have poor resistance to radiation, poor lubricity or excess volatility in vacuum.

One approach to attainment of improved overall fluid properties has been to synthesize compounds containing both aromatic ether groups characteristic of radiation resistance and thermal stability and siloxane groups of low-temperature fluid silicones. Ether siloxane compounds of the type disclosed in U.S. Pat. No. 3,114,759 show good radiation resistance and effective fluid properties at moderate to high temperatures, but their pour points are too high for many applications, and their lubricity is relatively low.

SUMMARY OF THE INVENTION

The present invention is directed to thiophenyl ether disiloxanes and trisiloxanes having low pour points and a high degree of radiation resistance, along with good lubricity and other properties favorable to their use as lubricant fluids or other functional fluids for service under extreme conditions. Substitution of sulfur for the phenoxy group oxygen of ether siloxane compounds has been found in this invention to result in a marked improvement in lubricity, while the siloxane units provide substantially decreased pour points.

It is therefore an object of this invention to provide improved lubricant and functional fluids for service over a wide range of temperatures.

Another object is to provide lubricant fluids that are resistant to nuclear and solar radiation.

Still another object is to provide lubricant fluids having a low vapor pressure.

Yet another object is to provide aromatic-group-containing siloxane compounds having low pour points and good lubricity.

Other objects and advantages of the invention will be apparent from the following detailed description.

DESCRIPTION OF THE PREFERRED EMBODIMENTS

Thiophenyl ether disiloxanes and trisiloxanes embodying the invention are represented by the formula

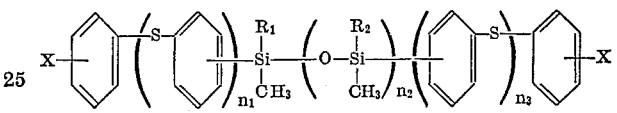

where X is an atom of hydrogen or a halogen such as chlorine or bromine; an alkyl radical including methyl, ethyl, propyl and the like; an aryl radical such as phenyl, biphenylyl, naphthyl, tolyl of xylyl; an aralkyl radical such as benzyl or phenylethyl or an alkaryl radical; $n_1$ and $n_3$ are integers from 1 to 3, inclusive, $n_2$ is an integer from 1 to 2, inclusive, and $R_1$ and $R_2$ are methyl or phenyl radicals. The most preferred specific compound, owing to its low pour point (−53° F.), good radiation resistance and lubricity properties on a par with commercially available polyphenyl ether lubricants, is 1,5-bis [3 - (phenylthio)phenyl] - 1,1,3,3,5,5-hexamethyltrisiloxane. Chlorine-substituted compounds, exemplified by 1,3-bis[3 - (4 - chlorophenylthio)phenyl] - 1,1,3,3-tetramethyldisiloxane, show outstanding lubricity, but a higher pour point (+3° F. for the named compound). Another specific compound embodying the invention is 1,3-bis [3-(phenylthio)phenyl]-1,1,3,3-tetramethyldisiloxane.

Novel siloxane compounds of this invention can be prepared by procedures similar to those previously used for preparing ether siloxanes, with a sulfur-containing reactant being substituted for the corresponding oxygen-containing ether compound. Disiloxanes are preferably prepared by reacting the Grignard reagent of a bromine-substituted phenylthiobenzene with a dichlorosilane and hydrolyzing the resulting arylthiophenylchlorosilane with water. Trisiloxanes can be prepared by reacting the above-mentioned Grignard reagent with a trisiloxane compound obtained by partial hydrolysis of the appropriate dichlorosilane such as dimethyl-dichlorosilane.

Compounds embodying the invention exhibit favorable overall properties for use as lubricant fluids in space or other severe environments. In addition to their good lubricity, resistance to radiation and liquidity over a wide temperature range, these compounds have a low vapor pressure, resistance to oxidation and thermal degradation at temperatures over 500° F. and good miscibility with lubricant additives. Other properties of the compounds, in particular, high bulk moduli and high surface tension, indicate their suitability for use as working fluids for use under severe condtions, for example, as hydraulic fluids in spacecraft hydraulic servomechanisms.

The invention is further illustrated by the following specific examples.

EXAMPLE 1

1,3-bis[3-(phenylthio)phenyl] - 1,1,3,3 - tetramethyldisiloxane was prepared by the following procedure. To a solution of 108 grams of sodium methoxide in 750 ml. of absolute ethanol was added 220 grams of benzenethiol. After refluxing for four hours, the solvent was distilled under vacuum, leaving 261.5 grams of sodium thiophenoxide in the form of a white product. A solution of 132 grams of the sodium thiophenoxide in 800 ml. of bis(2-methoxyethyl) ether was added dropwise during two hours to a refluxing solution of 236 grams of m-dibromobenzene in 200 ml. of bis(2-methoxyethyl) ether. The mixture was refluxed 22 hours longer and poured into a large amount of water. The brown oil which separated was washed several times with water, decolorized with charcoal, dried over potassium carbonate and distilled. After unreacted m-dibromobenzene was collected, 121.5 grams of product 1-bromo-3-(phenylthio)benzene distilled at 157–160° C. at 3 torr was recovered. A solution of 115 grams of the 1-bromo-3-(phenylthio)benzene in 100 ml. of tetrahydrofuran was added with stirring during three hours to 17 grams of magnesium suspended in tetrahydrofuran. Formation of the Grignard reagent was initiated with a small amount of 1-iodobutane. After stirring for 3 hours longer, the Grignard reagent was decanted and added slowly during 2 hours to 122 ml. of dimethyldichlorosilane. After stirring overnight, the tetrahydrofuran and excess dimethyldichlorosilane were distilled. Carbon tetrachloride was added, and the insoluble salt was separated by filtration. The filtrate was then heated up to 185° C. at 3 torr to remove volatile components from the product. [3-(phenylthio)phenyl]dimethyldichlorosilane was recovered at a yield of 73 percent of theoretical. A solution of 10 ml. of water in 30 ml. of dioxane was then added dropwise with stirring to a solution of 41.5 grams of the [3-(phenylthio)phenyl]dimethyldichlorosilane in 70 ml. of dioxane. After refluxing for 1.5 hours, the excess water and dioxane were removed under vacuum. The residue was washed with water and with methanol and then was dissolved in carbon tetrachloride. This solution was passed through a column of neutral alumina. The solvent was evaporated under vacuum, and the residue was filtered through a fiber glass filter. 28.7 grams of 1,3-bis[3-(phenylthio)phenyl]-1,1,3,3-tetramethyldisiloxane product was recovered.

EXAMPLE 2

1,3-bis[3-(4-chlorophenylthio)phenyl] - 1,1,3,3 - tetramethyldisiloxane was prepared by the fellowing proceduce. To a solution of 108 grams sodium methoxide in 750 ml. of absolute ethanol was added 289.3 grams of 4-chlorobenzenethiol. After refluxing with stirring for 6 hours, the solvent was distilled from the product sodium 4-chlorothiophenoxide. A solution of 333 grams of the product in 700 ml. of bis[2-(2-methoxyethoxy)ethyl]ether was added slowly during four hours to a refluxing solution of 944 grams of m-dibromobenzene in 800 ml. of the same solvent. The mixture was refluxed with stirring for 41 hours. It was then cooled, diluted with 1000 ml. of benzene, washed twice with a 4 percent aqueous sodium hydroxide solution, twice with a 4 percent aqueous sodium chloride solution and three times with water. Benzene and excess m-dibromobenzene were distilled, and 350 grams of the product 1-bromo-3-(4-chlorophenylthio)benzene distilled at 170–175° C. at 2 torr. A solution of 150 grams of the latter product in 500 ml. of anhydrous tetrahydrofuran was added slowly to 12.2 grams of magnesium. Formation of the Grignard reagent was initiated with a small amount of iodoethane and was completed in 6 hours. The reagent was then added to 122 ml. of dimethyldichlorosilane in tetrahydrofuran. After stirring for an hour, the excess dimethyldichlorosilane and tetrahydrofuran were distilled, and the salts were filtered off. The product [3-(4-chlorophenylthio)phenyl]dimethylchlorosilane distilled at 195–205° C. at 3 torr. A solution of 20 ml. of water in 25 ml. of dioxane was added dropwise with stirring to a solution of 57.6 grams of the latter product in 100 ml. of dioxane. After refluxing for 1.5 hours, excess water and dioxane were removed under vacuum. The residue was washed with methanol and then dissolved in carbon tetrachloride. The solution was then passed through a column of neutral alumina. The solvent was evaporated under vacuum, and the residue was filtered through a fiber glass filter. 42.1 grams of 1,3-bis[3-(4-chlorophenylthio)phenyl]-,1,3,3-tetramethyldisiloxane was recovered.

EXAMPLE 3

1,5 - bis[3 - phyeniylthio)phenyl] - 1,1,3,3,3,5,5 - hexamethyltrisiloxane was prepared by the following procedure. A solution of 53 grams of water in 60 ml. of dioxane was added dropwise with stirring during two hours to a solution of 750 grams of dimethyldichlorosilane in 750 ml. of anhydrous ethyl ether. The solution was then distilled through a short Vigreux column to separate the solvents. The higher boiling material was then redistilled through a 16-inch Vigreux column. The fraction distilling at 136–140° C. at 760 torr (1,3-dichloro-1,1,3,3-tetramethyldisiloxane) weighed 136.6 grams and the fraction distilling at 174–178° C. at 760 torr (1,5 - dichloro - 1,1,3,3,5,5 - hexamethyltrisiloxane) weighed 76.7 grams. A solution of 115.8 grams of 1-bromo-3-(phenylthio) benzene in 500 ml. of anhydrous tetrahydrofuran was added slowly to 10.6 grams of magnesium. Formation of Grignard reagent was completed in 5 hours. The reagent was then added dropwise over 1.5 hours to a solution of 57.7 grams of the trisiloxane fraction in 500 ml. of anhydrous tetrahydrofuran. The mixture was refluxed 2 hours, cooled and treated with water. The solvent in the organic phase was removed by heating in vacuum. The residue was dissolved in carbon tetrachloride and passed through a column of neutral alumina. The solvent was evaporated under vacuum, leaving 108.5 grams of 1,5 - bis[3 - (phenylthio)phenyl] - 1,1,3,3,5,5-hexamethyltrisiloxane.

Samples prepared in the above examples were subjected to elemental analyses to confirm their purity, and their structures were established by infrared and nuclear magnetic resonance spectroscopy.

Physical properties of the compound of Example 3 were determined to be as follows: pour point, −53° F.; viscosity, kinematic, 22,740 centistokes at −45° F., 8,226 centistokes at −35° F., 599 centistokes at 0° F., 20.49 centistokes at 100° F., 4.99 centistokes at 210° F. and 1.6 centistokes at 400° F. (extrapolated); vapor pressure $1 \times 10^{-6}$ torr at 100° F., $1 \times 10^{-3}$ torr at 350° F.; thermal and oxidation stability, to 500° F.; bulk moduli (isothermal secant), 250,000 p.s.i. at 100° F, and 132,000 p.s.i. at 350° F.; surface tension at 75° F., 35 dynes per centimeter; and LFW–1 lubricant rating, 2. Samples irradiated with a cobalt-60 source to a dosage level of $10^{10}$ ergs per gram showed only slight changes after irradiation. The compounds of Examples 1 and 2 displayed similar properties, except that the chlorinated product (Example 2) had a substantially higher pour point and higher viscosity, but its lubricity was better than for the material of Example 3.

It is to be understood that the above examples are merely illustrative of the invention and that various changes and modifications in the procedures described could be employed without departing from the invention.

What is claimed is:

1. Thiophenyl ether siloxanes having the formula

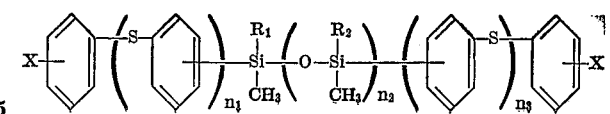

where X is a hydrogen atom, a halogen atom or an alkyl, aryl, alkaryl or aralkyl radical, $n_1$ and $n_3$ are integers from 1 to 3, inclusive, $n_2$ is an integer from 1 to 2, inclusive, and $R_1$ and $R_2$ are methyl or phenyl radicals.

2. Siloxane compounds of claim 1 wherein X is a hydrogen atom, a halogen atom or a hydrocarbon radical selected from the group consisting of methyl, ethyl, propyl, phenyl, biphenylyl, naphthyl, tolyl, xylyl, benzyl or phenylethyl radicals.

3. The compound of claim 2 wherein X is a hydrogen atom, $n_1$ and $n_3$ are 1, $n_2$ is 2 and $R_1$ and $R_2$ are methyl radicals.

4. The compound of claim 2 wherein X is a hydrogen atom, $n_1$ and $n_3$ are 1, $n_2$ is 1 and $R_1$ and $R_2$ are methyl radicals.

5. The compound of claim 2 wherein X is chlorine, $n_1$ and $n_3$ are 1, $n_2$ is 1 and $R_1$ and $R_2$ are methyl radicals.

References Cited

UNITED STATES PATENTS

| | | | |
|---|---|---|---|
| 2,863,898 | 12/1958 | Merker | 260—448.2 N |
| 3,914,548 | 11/1959 | Schroll | 260—448.2 N |
| 2,967,192 | 1/1961 | Kantor | 260—448.2 N |
| 3,506,674 | 4/1970 | Berger | 260—448.2 N X |
| 3,668,273 | 6/1972 | Krantz | 260—448.2 N X |
| 2,544,296 | 3/1951 | Burkhard | 260—448.2 N |

DANIEL E. WYMAN, Primary Examiner

P. F. SHAVER, Assistant Examiner

U.S. Cl. X.R.

252—496; 78